July 24, 1951  I. A. WOERNER  2,561,603
MACHINE FOR CUTTING AND CONTOURING THE ENDS OF PIPES
Filed Oct. 6, 1947  3 Sheets-Sheet 1
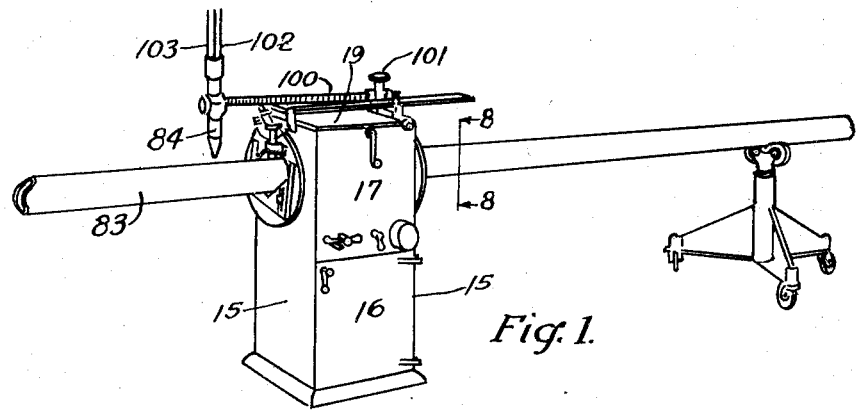
Fig. 1.
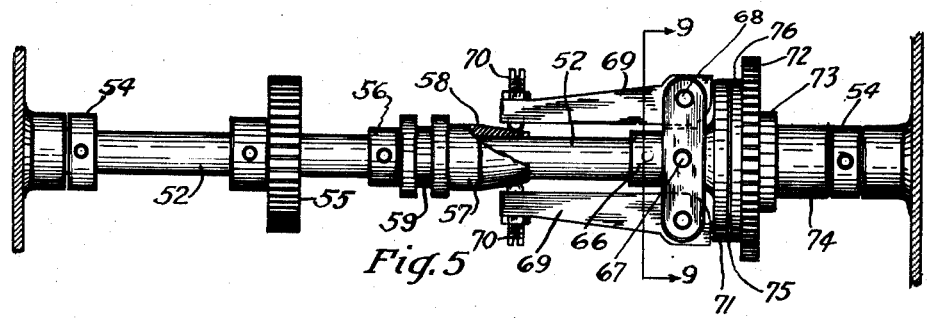
Fig. 5.
Fig. 7.
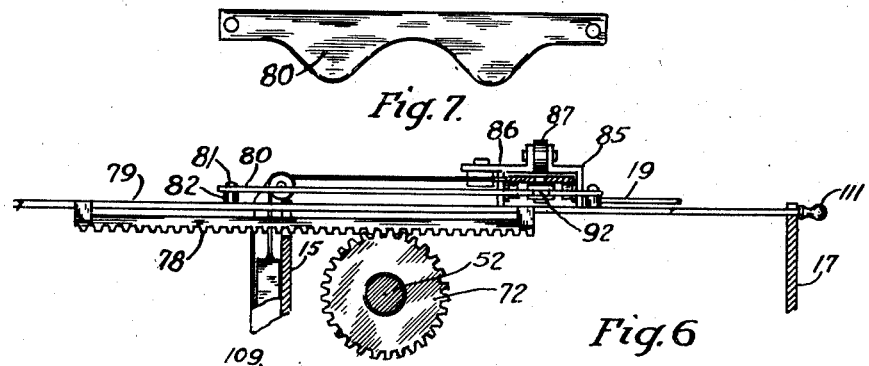
Fig. 6.
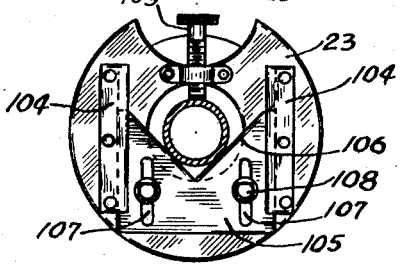
Fig. 8.
INVENTOR.
IRVIN A WOERNER
BY
Martin E. Anderson
ATTORNEY

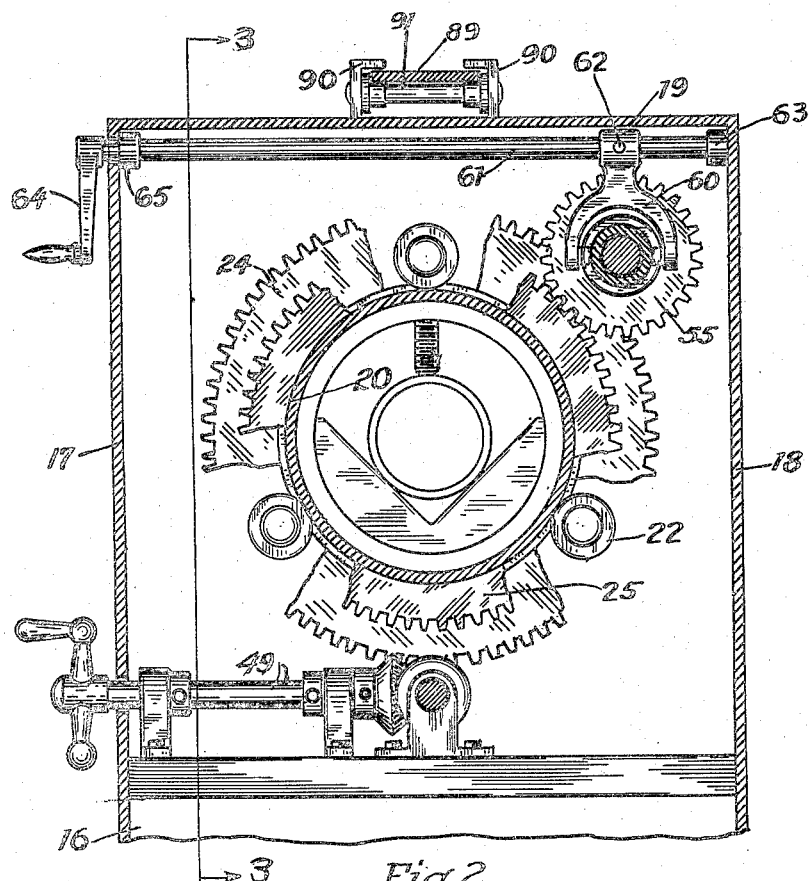
Fig. 2.
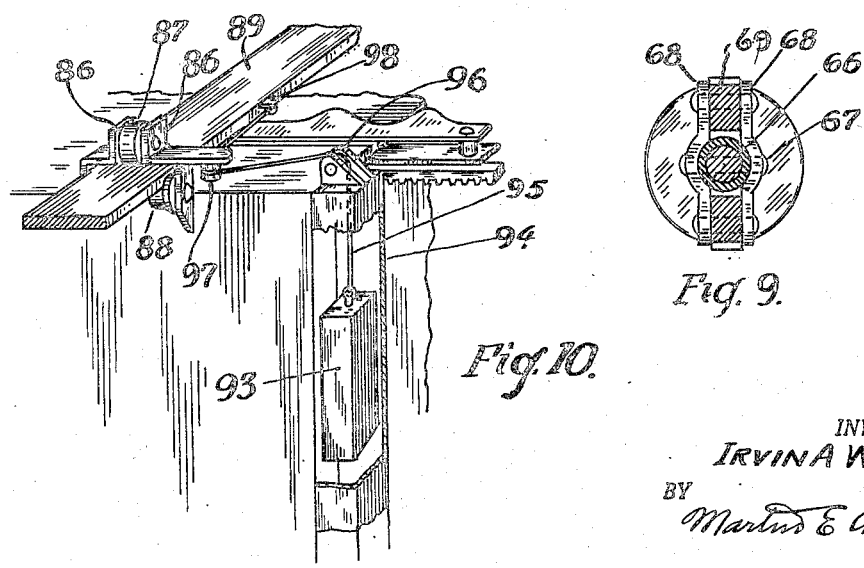
Fig. 9.
Fig. 10.

INVENTOR.
IRVIN A WOERNER
BY
Martin E Anderson
ATTORNEY

Patented July 24, 1951

2,561,603

UNITED STATES PATENT OFFICE 2,561,603

MACHINE FOR CUTTING AND CONTOURING THE ENDS OF PIPES

Irvin A. Woerner, Fort Collins, Colo.

Application October 6, 1947, Serial No. 778,247

1 Claim. (Cl. 266—23)

This invention relates to improvements in machines for cutting pipes and for contouring the ends thereof.

Since the advent of welding, the use of pipes for many different structures has increased greatly and such use requires the ends of the pipes to be contoured in order to make the proper welded connections.

Machines of different constructions have already been invented for use in contouring the ends of pipes, such machines employ a cutting torch of the usual acetylene type.

This invention relates to improvements in machines for contouring pipes and has for its principal object to produce a machine of a simple and substantial construction that can be manufactured at a comparatively low cost and which can be easily operated and controlled.

Another object of the invention is to produce a machine of this type which can be operated by means of an electric motor or by hand.

A further object of the invention is to produce a machine in which the movement of the torch can be stopped at any time and in which the template can be easily removed and replaced.

Another object of the invention is to produce a machine of the type indicated which shall be of such construction that the cutting torch is moved from the chuck in which the pipe is secured as distinguished from machines in which the movement of the template controls the rotation of the chuck and pipe.

Another object of the invention is to produce a machine of the type indicated that shall be of such construction that the template can be moved at different speed ratios to accommodate templates of designs requiring more than ordinary length.

The above and other objects that may become apparent as this description proceeds are attained by means of a construction and an arrangement of parts that will now be described in detail and for this purpose reference will be had to the accompanying drawing in which the invention has been illustrated in its preferred form, and in which:

Figure 1 is a perspective view of the machine showing the parts in operative position;

Figure 2 is a transverse vertical section taken on line 2—2, Figure 3;

Figure 5 is a side elevation of the counter shaft showing the clutch mechanism employed in connection with the movement of the template;

Figure 6 is a section taken on line 6—6, Figure 3;

Figure 7 is a top plan view showing one form of template;

Figure 8 is a section taken on line 8—8, Figure 1;

Figure 9 is a section taken on line 9—9, Figure 5; and

Figure 10 is a fragmentary perspective view of one corner of the machine showing the weight and guide therefor.

Figure 3:
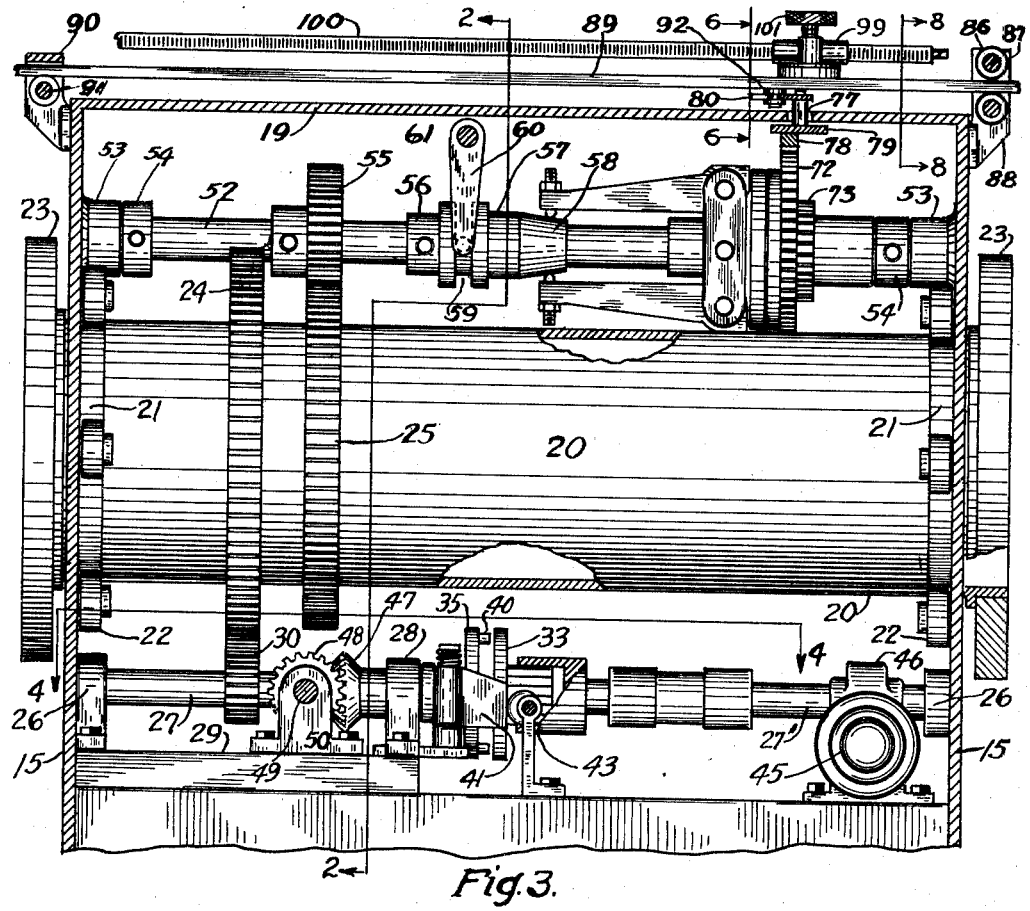
Figure 3 is a vertical section taken on line 3—3, Figure 2.
Figure 4:
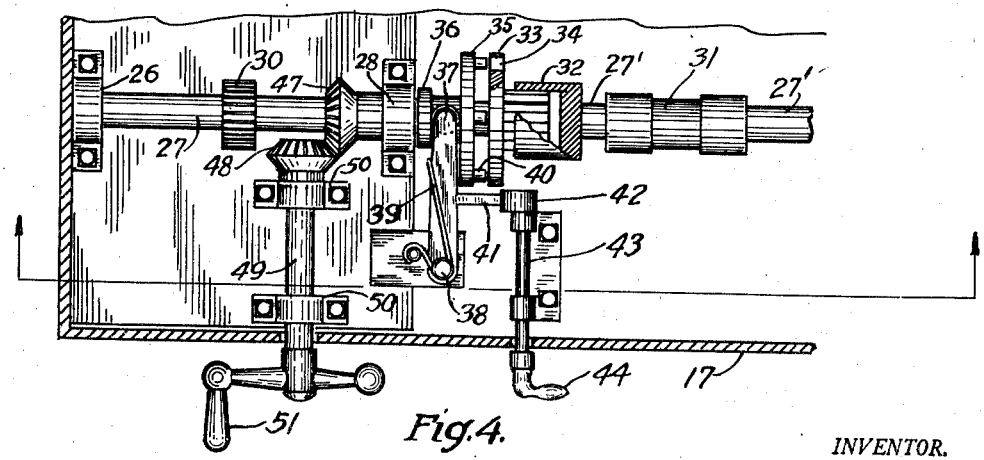
Figure 4 is a section taken on line 4—4, Figure 3.

Referring now to the drawing, reference numeral 15 designates the ends of the machine housing and reference numeral 16 designates a door closing a portion of the front of the machine, while reference numeral 17 designates the upper part of the front side. The rear wall of the machine has been designated by reference numeral 18. The top of the machine has been designated by reference numeral 19.

The ends 15 are provided with openings for the reception of the ends of the tubular chuck 20. This chuck is provided, in its outer surface, with grooves 21 which serve as tracks for the supporting rollers 22; since these rollers run in tracks 21 as shown, they serve the purpose of preventing longitudinal movement in addition to forming antifriction bearings. Secured to the outer ends of the chuck are plates 23, one of which is shown in Figure 8 to which reference will hereinafter be made. Tubular chuck or drum 20 is provided with two ring gears the larger of which has been designated by reference numeral 24 and the smaller by reference numeral 25.

Supported by the ends 15 are two bearings 26 for the shafts 27 and 27'. Shaft 27 is also mounted for rotation in a bearing 28 that rests on the elevated platform 29 and is provided with a spur pinion 30 that meshes with the ring gear 24. Shaft 27' is made in two sections and is connected by a suitable shaft coupling 31. The section of shaft 27' nearest the center has a cup-like bearing 32, in which the corresponding end of shaft 27 is mounted for rotation. A clutch disk 33 is splined to the inner surface of member 32 and is provided with a number of holes 34. A clutch disk 35 is splined to shaft 27 in such a manner that it may move longitudinally, but cannot rotate thereon. Clutch disk 35 has a hub provided with a groove 36 for the reception of the ends of fingers 37 of the shifting fork that is pivoted at 38. A spring 39 exerts a force tending to move clutch disk 35 into engagement with clutch disk 33. Clutch disk 35 is provided with about three pins 40 that are positioned to engage openings 34 in disk 33. The shifting fork has a vertical plate 41 projecting therefrom, which is always held in contact with the eccentric 42 by the action of spring 39. Eccentric 42 is secured to the inner end of shaft 43 that can be rotated by means of a handle 44 positioned on the outside of plate 17. By rotating shaft 43, the two clutch disks may be moved out of engagement or permitted to move into engagement as may be desired. An electric motor 45 is secured to the bottom plate and connected with shaft 27' by means of a worm gear which has not been shown in detail, but which has been indicated by reference numeral 46. The motor is preferably a variable speed motor controlled in the usual manner.

It is now apparent that when shafts 27 and 27' are interconnected by means of the clutch mechanism that has just been described, and the shaft rotated by means of the motor, such rotation will be transmitted to the cylindrical drum or chuck by means of pinion 30 and ring gear 24. The cylinder 20 can be rotated manually, if desired, and for this purpose shaft 27 has been provided with a bevel gear 47 that is in mesh with a bevel pinion 48 secured to the inner end of shaft 49. This shaft is mounted in bearings 50 and can be rotated by means of a crank 51.

Positioned above the cylindrical drum or chuck 20 is a counter shaft 52. The ends of this shaft are mounted for rotation in bearings 53 secured to the end plates 15. Collars 54 are secured to the shaft and prevent longitudinal movement. Ring gear 25 meshes with spur pinion 55 on shaft 52, as shown in the drawings. It is now evident that whenever cylinder 20 rotates, counter shaft 52 will also rotate. It is obvious that a single ring gear might perform the functions of both ring gears 24 and 25, if such construction were desired; however, for reasons of design, the two ring gears have been deemed more desirable than a single gear. A collar 56 is secured to shaft 52 and serves as an abutment to the sliding cam member 57. This member has a frusto-conical end surface 58 and is provided with a groove 59 for the ends of the shifting fork fingers 60 that are shown most clearly in Figure 2. The shifting fork is secured to the shaft 61 by means of a set screw 62 or by any other suitable means. The inner end of shaft 61 is journaled in a bearing 63 and the outer end is provided with a crank 64. A collar 65 holds the shaft from longitudinal movement. By rotating shaft 61, the cam member 57 can be moved longitudinally on shaft 52.

Referring now more particularly to Figures 5 and 9, it will be observed that a sleeve 66 is secured to shaft 52 and held from rotation thereon by means of a pin 67. Extending in opposite directions from sleeve 66 are spaced ends or lugs 68 between which are pivoted cam arms 69. The free ends of arms 69 are provided with adjustable bolts 70 whose inner ends engage the frusto-conical surface 58 and when the latter is moved toward the right, when viewed as in Figure 5, the clutch arms will be spread apart. A clutch plate 71 is mounted on shaft 52 for a slight longitudinal movement, but held from rotary movement thereon by splines in a manner well known. A double spur gear comprising the two gears 72 and 73 that are secured to hub 74 are mounted on shaft 52 for free rotation, but are held against outward longitudinal movement by means of collar 54. A felt ring 75 separates the clutch disk 76 from the clutch disk 76 of gear 72. When cam member 57 is in the position shown in Figures 3 and 5, gears 72 and 73 may freely rotate on shaft 52, but by moving the cam sleeve 57 towards the right, the clutch fingers spread apart and move the cam plate 71 into engagement with clutch disk 76, thereby clamping the gears in such a way that they rotate with shaft 52.

The top plate 19 is provided with a transversely extending opening 77 for a purpose which will directly appear. A rack 78 is secured to the under side of a plate 79 and held in a position to mesh with the gear 72 on shaft 52. A template 80 is secured to plate 79 by means of bolts 81 and spacers 82. When gear 72 rotates, the rack will, of course, move transversely as is evident from Figure 6. The template which has been shown in Figure 7 has a cam edge designed to form certain contour on the end of pipe 83 and controls the position of a cutting torch 84 by means which will now be described.

Extending upwardly from end plate 15 at the right when viewed as in Figure 3, are two brackets 85 and 86. A roller 87 is mounted for rotation between the upper ends of these brackets and two rollers 88 are positioned a short distance below and support a slide 89. The end plates 15 at the other end are provided with two brackets 90, best seen in Figure 2. The upper ends of these overlap the slide plate 89 and positioned underneath the side plate is a roller 91. Plate 89 is provided with a downwardly extending cam follower 92 that contacts the cam edge of template 80. A weight 93 is slidably mounted in a vertical housing 94 and has attached thereto a wire or flexible metal cable 95 that passes over a pulley 96 and goes from thence to and around a grooved pulley 97 and has its end connected with the slide plate 89 at point 98. The weight tends to move the slide plate towards the right when viewed as in Figure 3 and holds the cam follower in contact with the cam edge of the template and therefore whenever the template is moved, plate 89 will have a longitudinal movement controlled by the shape of the cam edge.

Secured to the upper surface of plate 89 is a support 99 having an opening through which the rack bar 100 can reciprocate. A pinion is positioned in the support 99 and can be rotated by means of the knurled wheel 101. The rack bar 100 can thus be adjusted longitudinally within certain limits. Secured to the outer end of the rack bar is a torch 84 as shown in Figure 1. This torch is positioned directly above the pipe 83 and oxygen and acetylene gas are conducted to the torch by means of flexible tubes 102 and 103.

Plates 23 that are secured to the ends of the cylindrical chuck member 20 have guides 104 in which is slidably mounted a plate 105 that has a rectangular notch 106. This plate is also provided with elongated openings 107 through which clamping bolts 108 extend. A pipe 83 is positioned in the notch in plate 105 as shown and clamped by means of a screw 109. By means of this chuck arrangement, pipes of any diameter can be centered and clamped in position so as to rotate with the chuck.

Let us now assume that the parts that have been described above are related in an operative manner as shown in the drawing and that the rotatable parts are turned in such a direction as to move the rack 78 with its template 80 from left to right, when viewed as in Figure 6. During this motion the pipe will turn about its axis and at the same time the torch will be moved forwardly and rearwardly in accordance with the cam surface on the template. By first providing templates that will produce the proper end contour of the pipe, any number of pipes can be contoured in exactly the same manner with the assurance that all of the contours will be exactly correct.

If, for any reason, it is desired to cut a longitudinal slot in the pipe, this can be accomplished by holding the pipe stationary and moving the torch manually.

Particular attention is called to the fact that the template is moved by the rotation of the chuck and is therefore moved by power derived from the motor and that the rack and template may be moved independently by releasing the clutch mechanism shown in Figure 5 and applying a force to handle 111. The rack with its attached plate 79 and the template can be entirely removed by releasing the clutch mechanism shown in Figure 5. This makes it possible to replace templates with others and to easily reinsert the rack and template. If a very long template is moved, the parts are arranged as shown in Figure 3, but if a shorter template is sufficient a different rack is provided that cooperates with gear 73 instead of with gear 72.

Having described the invention what is claimed as new is:

A machine for cutting and contouring the ends of pipes, comprising a supporting frame having spaced ends, a tubular chuck mounted in bearings in the ends, means at the end of the chuck for centering a pipe therein, a ring gear surrounding the chuck, a drive shaft mounted for rotation on the frame, said shaft having a pinion in operative engagement with the ring gear, said drive shaft comprising two aligned sections, a shaft coupling interconnecting the two shaft sections, manually controlled means for rendering the shaft coupling inoperative, manually operable means for turning that portion of the drive shaft that has the pinion, whereby the chuck may be manually rotated, a countershaft mounted on the frame for rotation about an axis positioned above the center of the cylindrical member, means for rotating the countershaft at a speed directly proportional to the angular speed of the tubular member, a spur gear mounted on the countershaft for free rotation, a clutch mechanism carried by the countershaft for frictionally securing the spur gear to the shaft for conjoint rotation, a rack in operative engagement with the spur gear for movement transversely of the countershaft axis, a template carried by the rack, a plate connected with the ends of the frame for sliding movement in a line parallel with the axis of the chuck, a cam follower extending downwardly from the plate in position to engage the cam edge of the template, means comprising a weight for urging the cam follower into engagement with the template, whereby the plate will be controlled in its axial movements by the template, and a cutting torch carried by the plate and positioned above the pipe in a diametrical plane.

IRVIN A. WOERNER.

REFERENCES CITED

The following references are of record in the file of this patent:

UNITED STATES PATENTS

| Number | Name | Date |
|---|---|---|
| 1,879,346 | Lawrence | Sept. 27, 1932 |
| 2,295,182 | Norton | Sept. 8, 1942 |
| 2,295,229 | McGuire | Sept. 8, 1942 |
| 2,379,630 | Fall | July 3, 1945 |
| 2,383,607 | Lovers et al. | Aug. 28, 1945 |
| 2,460,412 | Douglass | Feb. 1, 1949 |